United States Patent
Rohden (10) Patent No.: US 9,580,158 B2
(45) Date of Patent: Feb. 28, 2017

(54) MAGNUS ROTOR

(75) Inventor: Rolf Rohden, Aurich (DE)

(73) Assignee: WOBBEN PROPERTIES GMBH, Aurich (DE)

(*) Notice: Subject to any disclaimer, the term of this patent is extended or adjusted under 35 U.S.C. 154(b) by 1018 days.

(21) Appl. No.: 13/822,998

(22) PCT Filed: Aug. 31, 2011

(86) PCT No.: PCT/EP2011/064996
§ 371 (c)(1),
(2), (4) Date: May 23, 2013

(87) PCT Pub. No.: WO2012/034861
PCT Pub. Date: Mar. 22, 2012

(65) Prior Publication Data
US 2013/0243593 A1    Sep. 19, 2013

(30) Foreign Application Priority Data

Sep. 16, 2010    (DE) .................. 10 2010 040 917

(51) Int. Cl.
*B63H 9/02*    (2006.01)
(52) U.S. Cl.
CPC .............. *B63H 9/02* (2013.01); *Y02T 70/58* (2013.01)
(58) Field of Classification Search
CPC ........ F03D 11/0025; F03D 3/005; F03D 3/06; F03D 3/007; F03D 9/006; F03D 1/0616; B63H 9/02
USPC ............................................................ 416/4
See application file for complete search history.

(56) References Cited

U.S. PATENT DOCUMENTS

| 1,674,169 | A |   | 6/1928  | Flettner |
| 1,697,574 | A | * | 1/1929  | Savonius ............. F03D 3/007 416/110 |
| 2,713,392 | A |   | 7/1955  | Von Karman et al. |
| 4,228,563 | A |   | 10/1980 | Weber |
| 4,366,386 | A | * | 12/1982 | Hanson ................ F03D 1/06 290/44 |

(Continued)

FOREIGN PATENT DOCUMENTS

| AT | 110303 B | 8/1928 |
| BE | 895044 C | 3/1983 |

(Continued)

OTHER PUBLICATIONS

"Hybrid rotors for wind propulsion," *Marine Engineers Review*:54-55, London, GB, Sep. 1, 1991.

(Continued)

*Primary Examiner* — Craig Kim
*Assistant Examiner* — Julian Getachew
(74) *Attorney, Agent, or Firm* — Seed Intellectual Property Law Group LLP (57) ABSTRACT

The present invention concerns a Magnus rotor comprising a carrier arranged in the interior of the Magnus rotor, a rotor which in operation of the Magnus rotor rotates about the carrier, a bearing which carries the rotor on the carrier and a heating device provided for producing heated air in the interior of the carrier. The carrier has at least one opening at its outside, which connects the internal space in the carrier to the intermediate space between the carrier and the rotor in such a way that air can pass through between those two spaces.

12 Claims, 8 Drawing Sheets

(56) References Cited

U.S. PATENT DOCUMENTS

| | | | |
|---|---|---|---|
| 4,398,895 A | 8/1983 | Asker | |
| 4,401,284 A | 8/1983 | Austin | |
| 4,446,379 A | 5/1984 | Borg et al. | |
| 4,582,013 A | 4/1986 | Holland, Jr. | |
| 4,602,584 A | 7/1986 | North et al. | |
| 4,630,997 A | 12/1986 | Cousteau et al. | |
| 5,176,581 A | 1/1993 | Kumm | |
| 6,830,436 B2 * | 12/2004 | Shibata | F03D 1/0641 |
| | | | 416/228 |
| 6,848,382 B1 | 2/2005 | Bekker | |
| 7,217,091 B2 * | 5/2007 | LeMieux | F01D 11/00 |
| | | | 415/905 |
| 8,047,774 B2 * | 11/2011 | Bagepalli | F03D 11/00 |
| | | | 165/100 |
| 8,230,798 B2 | 7/2012 | Rohden et al. | |
| 8,322,985 B2 | 12/2012 | Kawai et al. | |
| 2009/0217851 A1 | 9/2009 | Kind | |
| 2009/0241820 A1 | 10/2009 | Rohden | |
| 2011/0232555 A1 | 9/2011 | Levander | |
| 2013/0230399 A1 | 9/2013 | Rohden | |
| 2014/0137781 A1 | 5/2014 | Rohden | |

FOREIGN PATENT DOCUMENTS

| | | |
|---|---|---|
| CN | 101454197 A | 6/1999 |
| CN | 101198516 A | 6/2008 |
| DE | 422057 C | 11/1925 |
| DE | 558 426 C | 8/1932 |
| DE | 24 30 630 A | 4/1976 |
| DE | 24 47 861 A1 | 4/1976 |
| DE | 27 47 914 A1 | 5/1979 |
| DE | 29 08 159 A1 | 9/1979 |
| DE | 243 251 A1 | 12/1985 |
| DE | 692 18 428 T2 | 9/1991 |
| DE | 41 01 238 A1 | 7/1992 |
| DE | 29 818 774 U1 | 3/1999 |
| DE | 199 52 460 A1 | 5/2001 |
| DE | 101 02 740 A1 | 8/2002 |
| DE | 103 34 481 A1 | 3/2005 |
| DE | 10 2005 028 447 A1 | 12/2006 |
| DE | 102006025732 A1 | 12/2007 |
| EP | 0055638 A1 | 7/1982 |
| GB | 2 007 819 A | 5/1979 |
| GB | 2 187 154 A | 9/1987 |
| GB | 2 332 891 A | 7/1999 |
| JP | 56-57470 A | 5/1981 |
| JP | 57-55292 A | 4/1982 |
| JP | 63-195998 U | 12/1988 |
| JP | 2005-256606 A | 9/2005 |
| WO | 01/33076 A1 | 5/2001 |
| WO | 2006/133950 A2 | 12/2006 |

OTHER PUBLICATIONS

International Search Report, dated Apr. 21, 2008, for corresponding International Application No. PCT/EP2007/004816, 22 pages.
Risch et al., "Windschiffe," *VEB Verlag Technik*, Berlin, 1998, 5 pages.
Rizzo "The Flettner Rotor Ship in the Light of the Kutta-Joukowski Theory and of the Experimental Results," National Advisory Committee for Aeronautics, *Technical Note 228*, Washington, Oct. 1925, 29 pages.
Shipbuilding, "Rotosail to enter commercial service on 445 dwt ship," *Schiff & Hafen 7*, Hamburg Deutschland, Jul. 1985, 2 pages.
Wagner, Claus D.: Die Segelmaschine. Hamburg. Ernst Kabel Verlag GmbH, 1991, pp. 85, 156-159.—ISBN 3-8225-0158-1.

* cited by examiner

MAGNUS ROTOR

BACKGROUND

Technical Field

The present invention concerns a Magnus rotor.

Description of the Related Art

Magnus rotors are also referred to as Flettner rotors or sailing rotors.

Magnus rotors are known in the state of the art. Particularly in the form of ship drives they are also known by the term Flettner rotor and equipping ships with such a Flettner rotor or Magnus rotor is described in the book 'Die Segelmaschine' by Klaus D Wagner, Ernst Kabel Verlag GmbH, Hamburg 1991.

As such ship drives produce a propulsion force for the ship, with the co-operation of the rotary movement of the rotor and the wind flowing therearound, Magnus rotors can basically be used as ship drives wherever sufficient winds prevail. That is basically the case on all seas around the globe, that is to say in all climatic regions of the earth.

In that respect however the seas and climatic regions of the earth have very different climatic conditions and weather conditions which can fluctuate greatly even at the same location according to the seasons involved. Those climatic conditions can lead to a restriction on the use of a Magnus rotor.

As general state of the art, attention is directed to DE 10 2006 025 732 A1.

BRIEF SUMMARY

There is provided a Magnus rotor comprising a carrier arranged in the interior of the Magnus rotor, a rotor which in operation of the Magnus rotor rotates about the carrier, a bearing which carries the rotor on the carrier and a heating device provided for producing heated air in the interior of the carrier. The carrier has at least one opening at its outside, which connects the internal space in the carrier to the intermediate space between the carrier and the rotor in such a way that air can pass through between those two spaces.

It is advantageous to provide a heating device in the interior of the carrier, to cause that air to be heated and to allow the heated air to rise into the region outside and above the carrier to the rotor, through at least one opening, as that heated air heats the rotor from the interior and thereby ice which clings to its outside wall can be thawed off. An iced-up Magnus rotor can be rendered operative again by virtue of that thawing action as a Magnus rotor, to the outside of which ice is adhering, should not be operated. Thus the ice clinging to the rotor can represent a considerable additional mass which would have to be additionally driven and which worsens the efficiency of the Magnus rotor drive. In addition the ice can cling asymmetrically to the outside wall and in that way generate an unbalance which can adversely affect operation or make it impossible. There is also the risk that in operation ice clinging to the rotor is detached from the outside wall of the Magnus rotor and thrown off same, whereby the surrounding area can be endangered by the pieces of ice which are flung away. It is therefore necessary, for safety reasons and to restore operation of the Magnus rotor, to provide a possible way of being able to thaw an iced-up Magnus rotor as quickly as possible.

In an aspect of the invention it is provided that the heating device is connected to the carrier openings by way of at least one air guide means in such a way that the air heated by the heating device can be discharged into the intermediate space between the carrier and the rotor. That provides that the heated air is discharged as completely as possible and not just partially into that intermediate space, which is the case if the heated air were to be discharged from the heating device into the interior of the carrier and were to only partly rise up therefrom into that intermediate space. That can achieve higher efficiency in terms of utilizing the heat of the heated air for heating and thawing the rotor. Furthermore additional heating of the space inside the carrier may be undesirable so that in that respect also it is advantageous for the heated air to be discharged as completely as possible into the intermediate space between the carrier and the rotor.

In a further aspect of the invention the rotor is carried on the bearing by way of a connecting element. The connecting element has at least one opening which connects the intermediate space between the carrier and the rotor to the space above the connecting element in such a way that air can pass through between those two spaces. That opening in the supporting element, which connects the outside wall of the rotor to the bearing and the drive on the center line of the Magnus rotor permits air exchange upwardly into the internal space in the rotor in order to heat the Magnus rotor as completely as possible up to its upper end and to thaw it out.

In an aspect of the invention the heating device has a plurality of air guide means and/or the carrier has a plurality of openings and/or the connecting element has a plurality of openings. That on the one hand provides that air exchange upwardly into the rotor is increased, whereby at the same time greater or faster heating and thawing of the outside wall of the rotor is achieved. On the other hand, the air flow is distributed more uniformly within the rotor through a plurality of openings so that this also provides for more uniform and thus faster heating and thawing.

In a further aspect of the invention the connecting element is of such a configuration that the openings of the connecting element occupy more area in the horizontal plane than the connecting element itself. By virtue of such large openings, the space beneath and above the connecting element is connected together in such a way as to afford a unitary space which is as large as possible and in which the heated air can be quickly and uniformly distributed without separating means which cause a disturbance or which produce a channeling effect.

In an aspect of the invention the plurality of air guide means of the heating device and/or the plurality of openings of the carrier and/or the plurality of openings of the connecting element are provided distributed substantially uniformly around the periphery of the carrier and/or of the connecting element. That provides that the rising heated air is distributed as uniformly as possible as there are many, equally distributed openings provided equally over the periphery of the carrier and the connecting element respectively, and the heated air can rise into the internal space in the rotor through those openings.

In a further aspect of the invention the plurality of air guide means of the heating device and/or the plurality of openings of the carrier and/or the plurality of openings of the connecting element are provided on the periphery of the carrier and/or of the connecting element spaced as far as possible in the radial direction from the center line of the Magnus rotor. In that way the heated air can rise directly at the inside of the outside wall of the rotor and can thus deliver its heat energy thereto as quickly and as completely as possible.

In an aspect of the invention the plurality of air guide means of the heating device and/or the plurality of openings of the carrier and/or the plurality of openings of the connecting element are of such a configuration that their area is larger in the peripheral direction than in the radial direction. By virtue of that geometry, the openings are in the form of slots or the like in such a way that they bring an air flow, which is as large as possible, of the heated air into direct contact with the inside of the outside wall of the rotor, when the heated air rises. That promotes the delivery of heat to the outside wall of the rotor.

In a further aspect of the invention the rotor is made from aluminum. As aluminum has thermal conductivity which is comparatively good, for example in comparison with steel, the thermal energy from the heated air can be absorbed comparatively well and quickly. That promotes rapid thawing of the rotor.

In an aspect of the invention the carrier is made from steel. Steel has comparatively poor thermal conductivity for example in relation to aluminum. Therefore less thermal energy is absorbed by the steel carrier from the heated air, than the rotor does. In that way the heat of the heated air is used to the best possible degree for thawing the rotor.

In a further aspect of the invention provided in the interior of the carrier is an electric motor. The heating device is fed with the electrical energy by way of electric lines, by way of which the electric motor is fed in operation of the Magnus rotor. That arrangement of the power supply, alternatively either to the electric motor or to the heating device, makes use of the fact that those two devices are not operated at the same time as thawing of the rotor is effected precisely when it cannot be driven by means of the electric motor, because of icing. Thus the installation complication and expenditure for the power supply of those two devices can be reduced as that electrical power supply can be effected to the greatest possible extent by way of the same lines.

BRIEF DESCRIPTION OF THE SEVERAL VIEWS OF THE DRAWINGS

Embodiments by way of example and advantages of the invention are described in greater detail hereinafter with reference to the following Figures.

DETAILED DESCRIPTION

Figure 1:
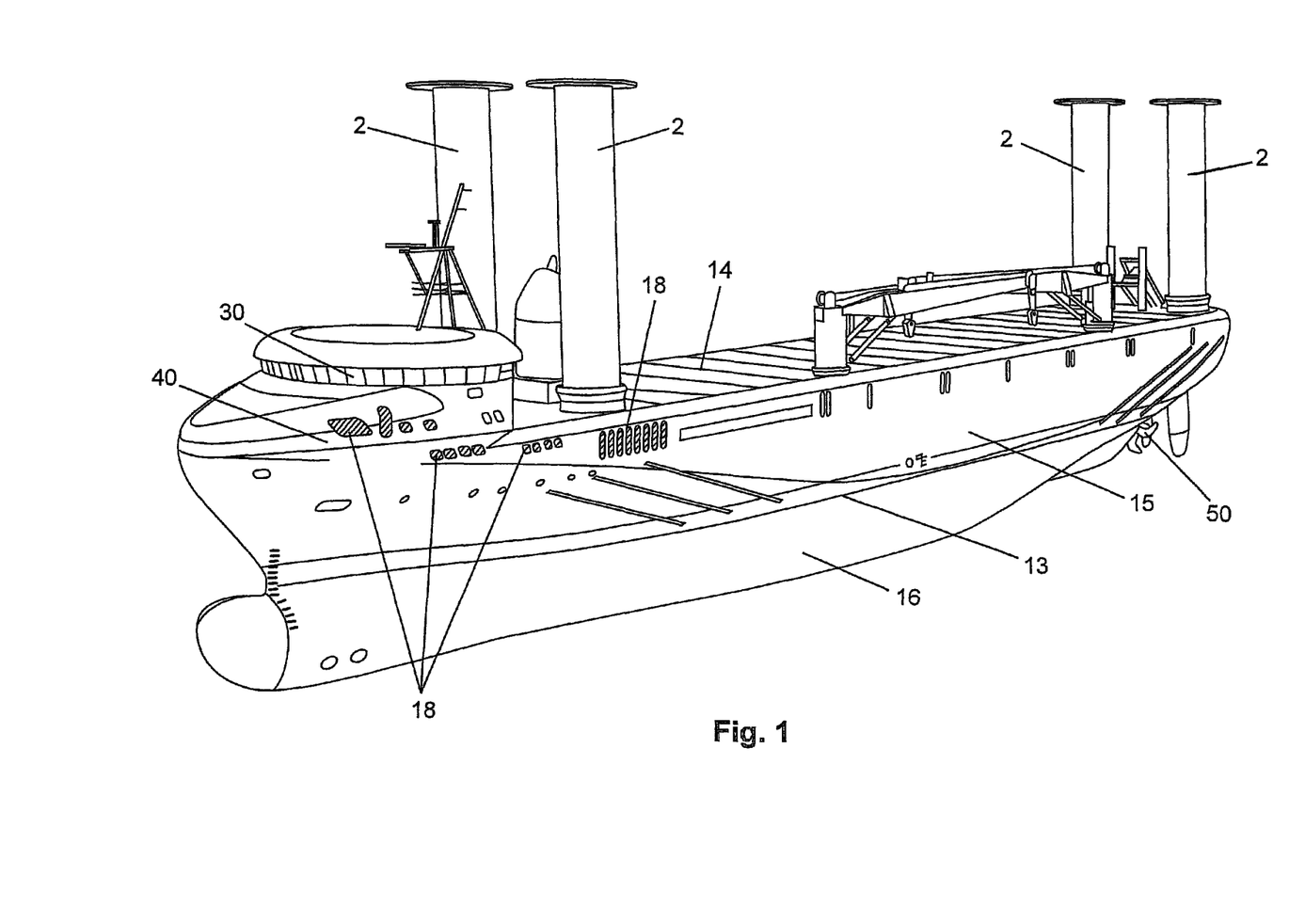
FIG. 1 shows a perspective view of a ship having a plurality of Magnus rotors.

FIG. 1 shows a diagrammatic view of a ship having a plurality of Magnus rotors 2. The ship has in this case a hull comprising an underwater region 16 and an above-water region 15. In addition the ship has four Magnus rotors or Flettner rotors 2 arranged at the four corners of the hull and preferably being cylindrical. In this case the four Magnus rotors 2 represent wind-operated drives for the ship according to the invention. The ship has a deckhouse 40 arranged in the forecastle and having a bridge 30. Under water the ship has a screw 50 or propeller 50. For improved maneuverability the ship can also have transverse thruster rudders, wherein preferably one is arranged at the stern and one to two are provided at the bow. Preferably those transverse thruster rudders are driven electrically. The accommodation quarters, galleys, provision store rooms, messes and so forth are arranged in the deckhouse 40. In this case the deckhouse 40, the bridge 30 and all superstructures above the weather deck 14 are of an aerodynamic shape to reduce wind resistance. That is achieved in particular by substantially avoiding sharp edges and sharp-edged structures. To minimize the wind resistance and achieve an aerodynamic shape, as few superstructures as possible are provided.

Figure 2:
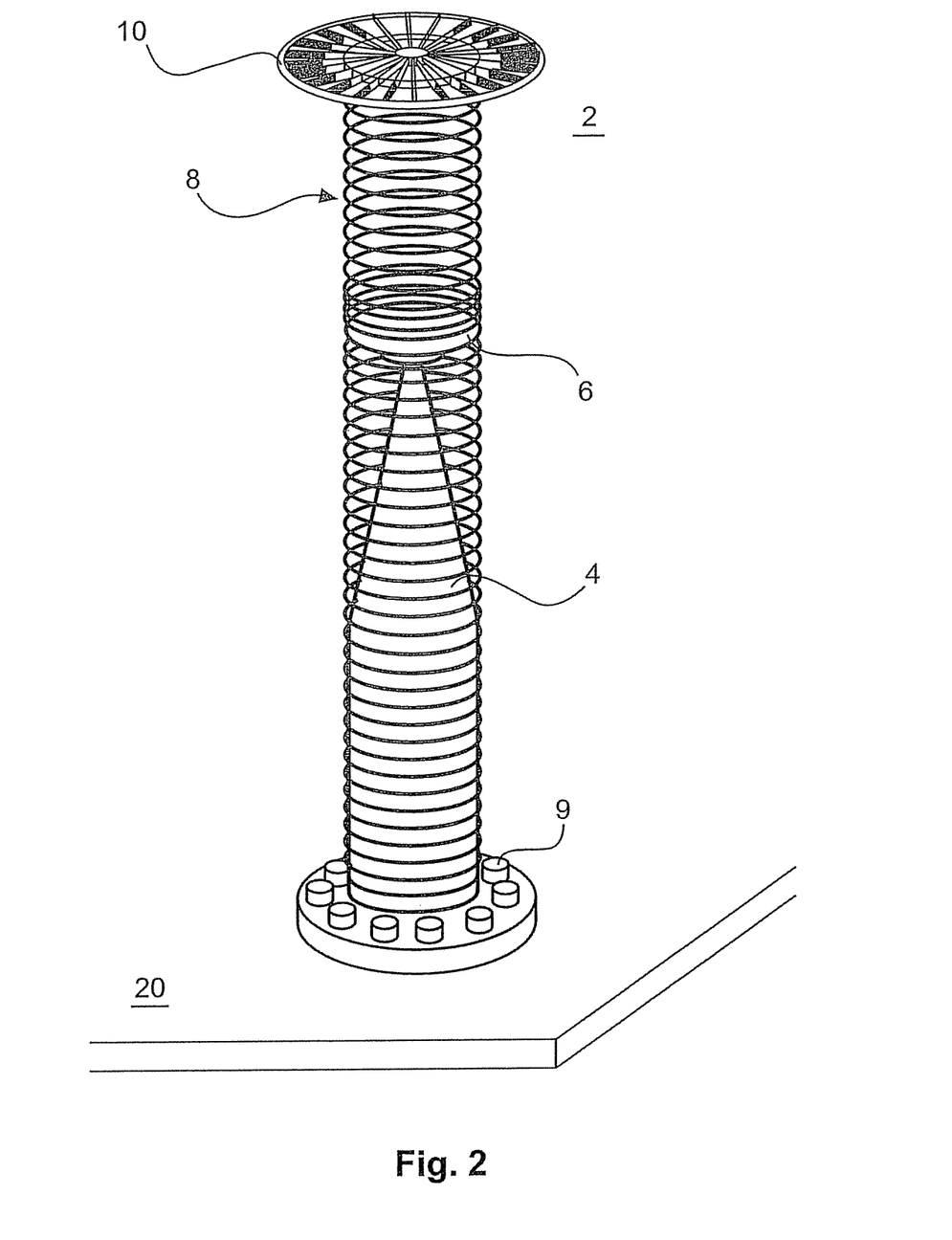
FIG. 2 shows a diagrammatic perspective view of a Magnus rotor.

FIG. 2 shows a diagrammatic perspective view of a Magnus rotor. The Magnus rotor 2 has an upper rotating part as the rotor 8 and a lower stationary part as the carrier 4, which are connected together by way of a bearing 6. An end plate 10 is mounted to the rotor 8 at the upper end thereof. The carrier 4 of the Magnus rotor 2 is fixed on a base plate 20 by way of bolts or screws 9. If the Magnus rotor 2 is mounted for example on the deck of a ship or the like, there is no need for a corresponding base plate 20 for fixing the carrier 4 as the base plate is formed by the deck of the ship or the like itself. In that respect the carrier 4 is arranged in the interior of the Magnus rotor 2. The upper rotor 8 rotates on that carrier, by means of the bearing 6. The bearing 6 can be a known rolling bearing or any other suitable bearing construction.

Figure 3:
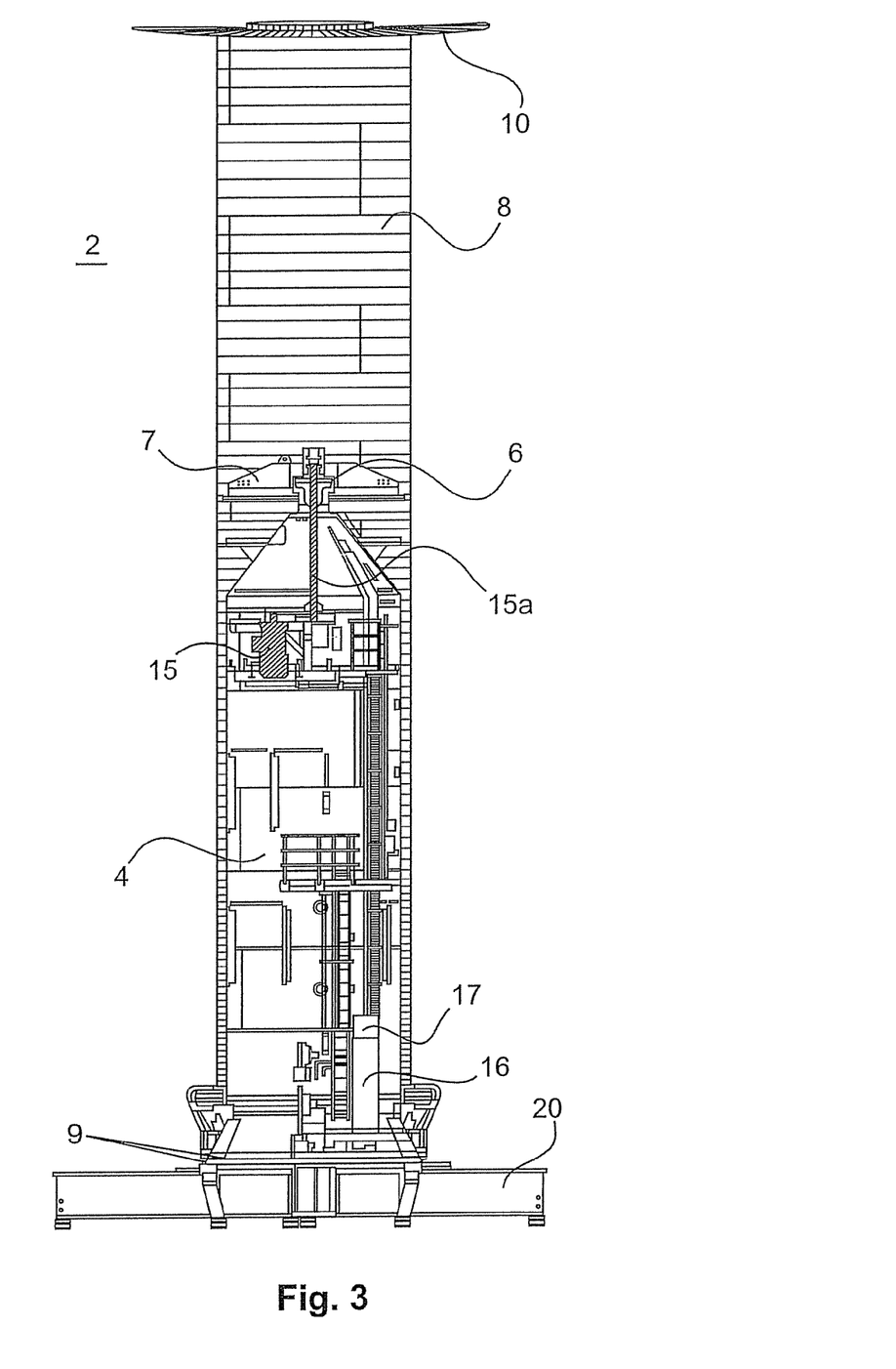
FIG. 3 shows a detailed diagrammatic side view of the Magnus rotor.

FIG. 3 shows a detailed diagrammatic side view of the Magnus rotor 2. Provided in the interior of the Magnus rotor 2 are a drive 15 for driving the rotor 8, that is to say for rotating it, as well as a control 16 for controlling the drive 15 and an inverter 17 for feeding the drive 15. They are provided in the interior of the carrier 4. In this arrangement the drive 15 of the rotor 8 is disposed in the upper region of the stationary carrier 4 so that the drive shaft 15a of the drive 15 is passed through the bearing 6. The upper rotor 8 is connected to the drive shaft 15a by way of a hub 7. The Magnus rotor 2 is mounted on the base plate 20 or the deck of a ship or the like by bolts or screws 9. The Magnus rotor 2 has the inwardly disposed carrier 4, the bearing 6, the upper rotor 8 and the end plate 10, as described and shown in FIG. 2.

Figure 4:
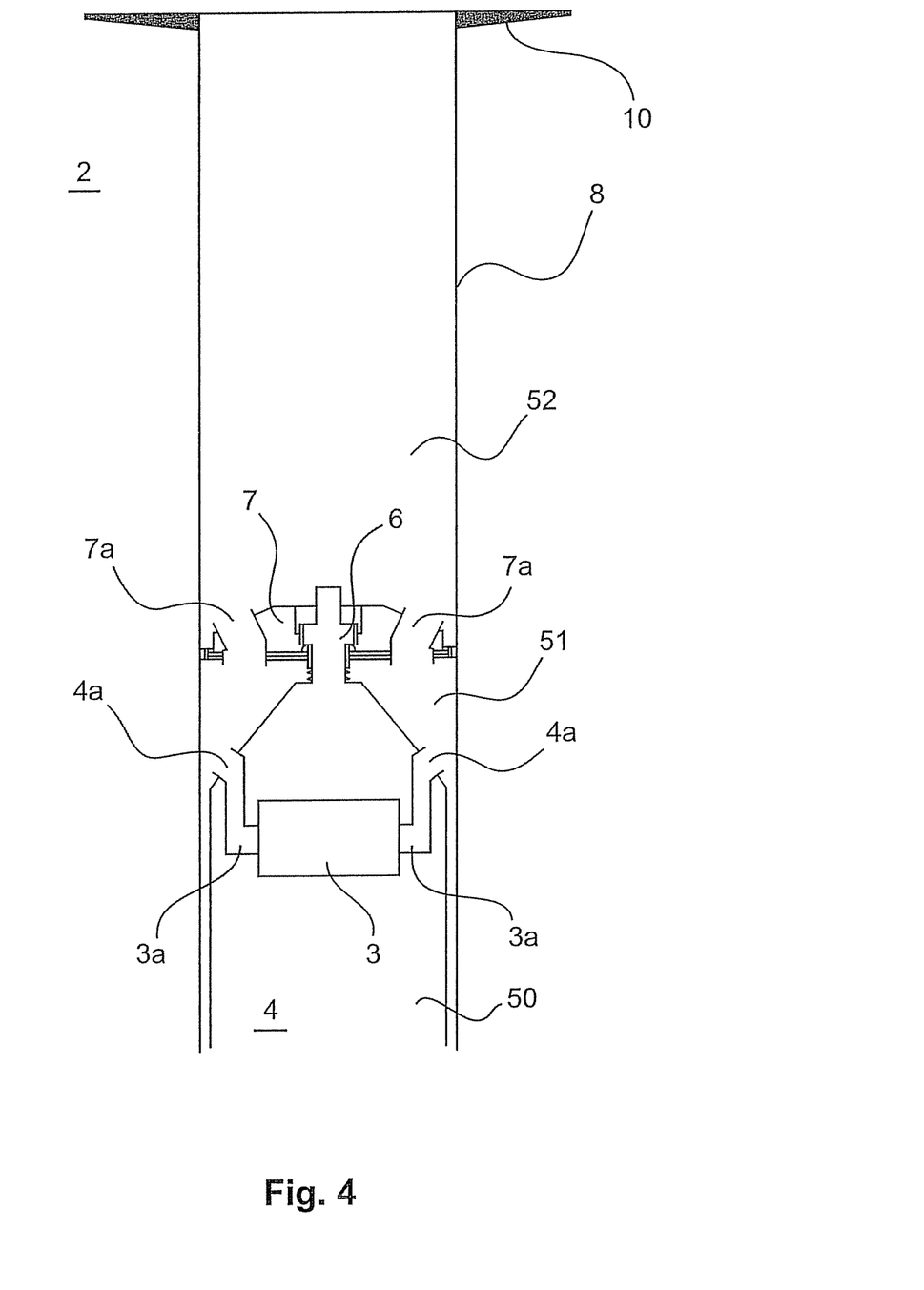
FIG. 4 shows a diagrammatic simplified side view of the Magnus rotor with a heating device in a first embodiment.

FIG. 4 shows a diagrammatic simplified side view of the Magnus rotor 2 with a heating device 3 in a first embodiment. The Figure shows the rotor 8 with end plate 10 and hub 7 as the parts which move in operation of the Magnus rotor 2. They are supported by way of the drive shaft 15a (not shown) which also rotates, on the bearing 6 of the carrier 4.

Shown in the interior of the carrier 4 as a heating device 3 is a fan heater 3 provided in the upper region of the carrier 4. The fan heater 3 produces hot air by drawing in air from the surroundings, that is to say from the internal space 50 in the carrier 4, and moving it for example past windings heated by electric current. In that case the air which is drawn in absorbs heat from the windings through which current flows. That heated air is then blown out by the fan heater 3. That is effected by way of at least one fan heater tube 3a connected to the discharge opening of the fan heater 3. That heating air tube 3a leads to at least one carrier opening 4a provided in the carrier 4 to connect the internal space 50 in the carrier 4 to the intermediate space 51, 52 between the carrier 4 and the rotor 8. In this case the intermediate space 51, 52 comprises an intermediate space 51 which is substantially formed by the volume between the carrier 4, the hub 7 and the part of the rotor 8 beneath the hub 7, and an intermediate space 52 which is substantially formed by the volume between the hub 7, the part of the rotor 8 above the hub 7 and the end plate 10. In that way the heated air is blown out of the carrier 4 into the intermediate space 51, 52 by way of that carrier opening 4a from the fan heater 3, by way of the heating air tube 3a.

Alternatively the heating device 3 used can also be a heat exchanger 3 or the like, which takes the thermal energy for heating the air from a further fluid and delivers the thermal energy obtained therefrom at least partially to the air which issues from the fan heater tubes 3a. Thus for example thermal energy can be obtained by way of a heat exchanger 3 for example from the exhaust gases of an internal combustion engine of the ship which drives its screw 50 or propeller 50 or generates electrical energy for an electric motor for driving the screw 50 or the propeller 50, and that thermal energy can be at least partially used to produce heated air.

As the heated air rises upwardly the outside wall of the rotor 8 is heated and thereby thawed as from substantially the height of the carrier opening 4a, in which the carrier openings 4a are provided. It will be noted however that the air flow is limited upwardly by the hub 7 connecting the outside wall of the rotor 8 to the drive shaft 15a. It is therefore necessary to also provide at least one hub opening 7a in the hub 7 so that the heated air can rise further upwardly in order to heat and thaw out the entire upper region of the rotor 8. In other words the heated air is delivered into the intermediate space 51 by the carrier openings 4a. As however that intermediate space 51 is separated from the intermediate space 52 by the hub 7 the hub openings 7a are required to connect the two intermediate spaces 51 and 52 together and to permit air exchange between them.

Figure 5:
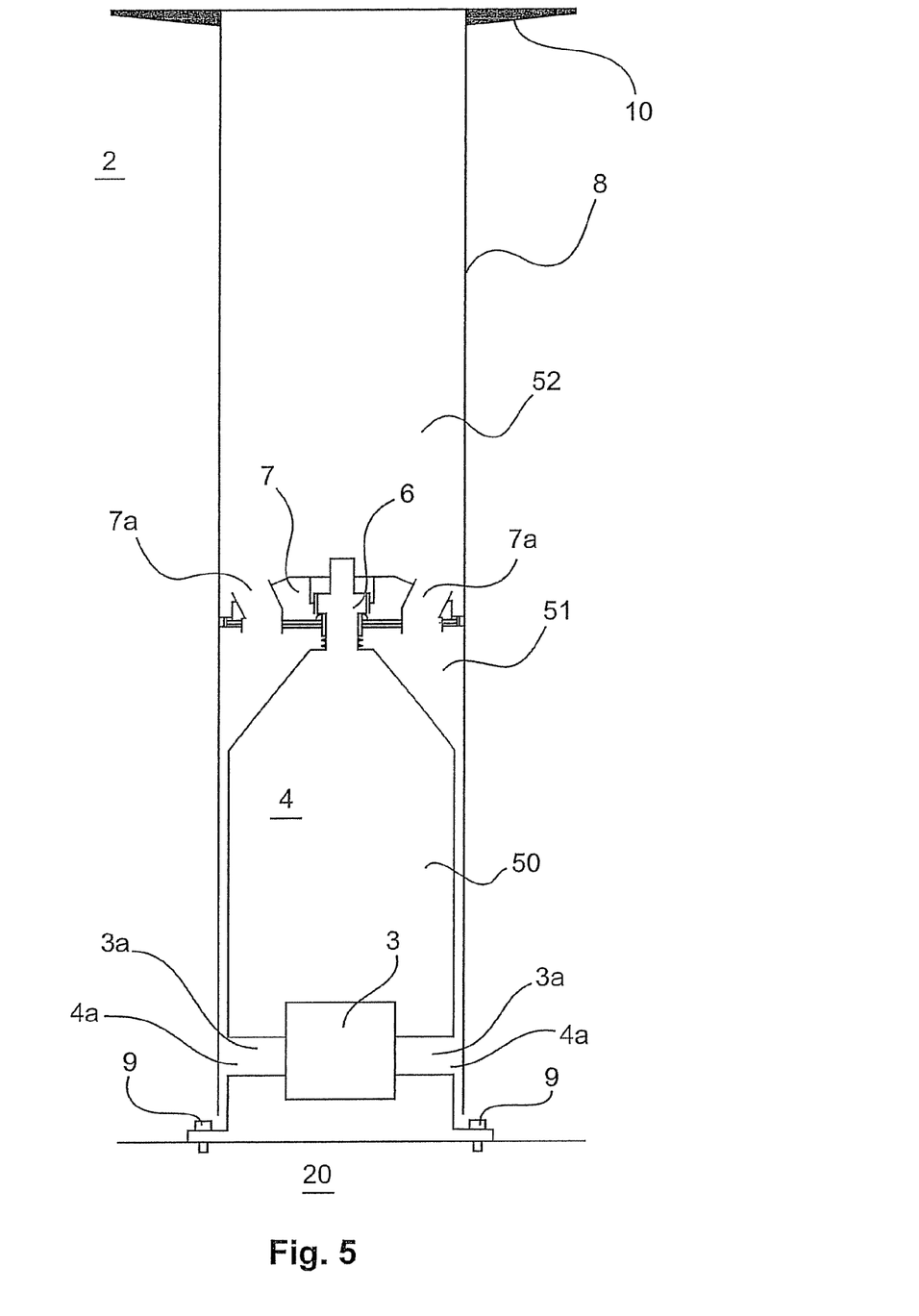
FIG. 5 shows a diagrammatic simplified side view of the Magnus rotor with a heating device in a second embodiment.

FIG. 5 shows a diagrammatic simplified side view of the Magnus rotor 2 with a heating device 3 in a second embodiment. FIG. 5 shows substantially the components of FIG. 4. It additionally shows the base plate 20 or the ship deck or the like, on which the Magnus rotor 2 is fixed by means of bolts or screws 9.

In this second embodiment the heating device 3 is arranged in the lower region of the carrier 4 and the fan heater tubes 3a and carrier openings 4a are provided in radially oriented relationship in the region of the Magnus rotor 2 in which the outside wall of the rotor 8 extends around the carrier 4. In this embodiment therefore the hot air is taken past the outside wall of the rotor 8 almost over the entire height of the rotor.

In that way the outside wall can also be heated and thawed out over its entire height. In this embodiment however a part of the heat of the hot air is already delivered in the lower region of the rotor 8 to the outside wall thereof so that only still warm air, that is to say air which has been markedly cooled in relation to the air discharged from the fan heater tubes 3a, arrives in the upper region of the rotor 8. Accordingly the upper region of the rotor 8 is heated less than the lower portion so that, in the event of severe icing in the upper region of the rotor 8, that icing, under adverse conditions, cannot be removed completely or can be removed at least only slowly, in comparison with the first embodiment. In return, the second embodiment has the advantage over the first embodiment that here the entire height of the rotor 8 can be heated and thawed out, whereas in the first embodiment it is only the region approximately above the carrier openings 4a that is heated and thawed out as the hot air rises upwardly from those carrier openings 4a. It will be noted however in return that heating of that upper region of the rotor 8 in the first embodiment is greater than in the second embodiment.

In the first and second embodiments, FIGS. 4 and 5 show two fan heater tubes 3a, two carrier openings 4a and two hub openings 7a. In that respect however there may also be just one fan heater tube 3a, carrier opening 4a and hub opening 7a. It is also possible to provide more than two fan heater tubes 3a, carrier openings 4a and hub openings 7a. In addition, there may also be only one fan heater tube 3a and a plurality of carrier openings 4a and/or hub openings 7a. In that respect the important consideration is to convey as much heated air as possible out of the carrier 4 into the entire upper region of the rotor 8 of the Magnus rotor 2, that is to say the intermediate space 52, and to distribute it there as uniformly as possible at the outside wall thereof. Accordingly various configurations and combinations of fan heater tubes 3a, carrier openings 4a and hub openings 7a are possible.

Figure 6:
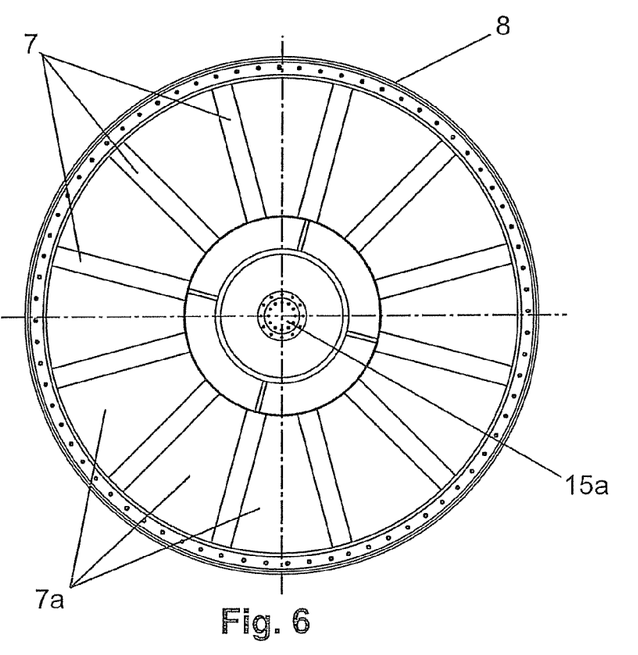
FIG. 6 shows a diagrammatic plan view of the hub of a Magnus rotor in the first and second embodiments.

FIG. 6 shows a diagrammatic plan view of a hub 7 of a Magnus rotor 2 in the first and second embodiments. In this view the hub 7 is of such a configuration that it connects the outside wall of the rotor 8 to the drive shaft 15a by way of ribs. As a result the openings 7a can be particularly large and the arrangement here provides an almost continuous intermediate space 51, 52 in the interior of the rotor 8 from the top side of the carrier 4 to the end plate 10 of the rotor 8, in which the hot air can rise from the carrier openings 4a almost unimpededly and in a straight line vertically to the end plate 10.

In the first and second embodiments it is advantageous in that respect for a plurality of fan heater tubes 3a, carrier openings 4a and hub openings 7a to be provided uniformly at the periphery of the carrier 4 and in the hub 7 respectively in order to blow out upwardly as much hot air as possible and also to distribute it as uniformly as possible in the intermediate space 51, 52 from the carrier 4 to the end plate 10 in order also to provide for uniform heating of the outside wall of the rotor 8.

The carrier openings 4a and/or hub openings 7a can also be of such a configuration that they specifically direct the flow of the rising hot air and distribute it in the internal space in the rotor 8. In that way the carrier openings 4a and/or the hub openings 7a can be provided as far outwardly as possible in the radial direction from the center line, that is to say the axis of rotation, of the Magnus rotor 2, in order to cause the hot air to rise as closely as possible past the outside wall of the rotor 8 from the discharge from the fan heater tubes 3a and thereby to provide for a delivery of heat which is as complete as possible from the rising hot air to the outside wall of the rotor 8. The carrier openings 4a and/or the hub openings 7a may also be in the form of slots or the like in order to guide the flow of the hot air past the outside wall of the rotor 8 in as laminar a flow as possible and thereby optimize heating of the outside wall of the rotor 8. That can provide that the sudden ice is thawed out as quickly and completely as possible.

Figure 7:
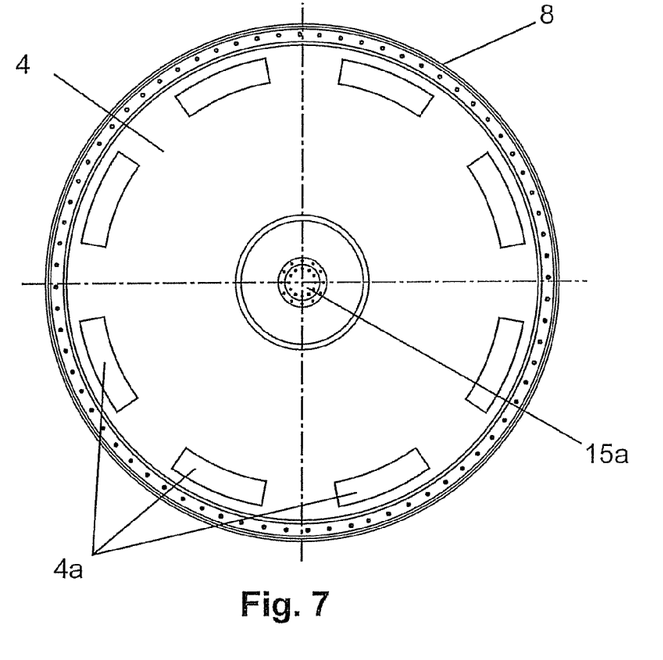
FIG. 7 shows a diagrammatic plan view of the carrier of a Magnus rotor in the first embodiment.

FIG. 7 shows a diagrammatic plan view of a carrier 4 of a Magnus rotor 2 in the first embodiment. In this view the carrier openings 4a are in the form of slots and are arranged as far outwardly as possible in the radial direction, that is to say as close as possible to the outside wall of the rotor 8, on the upper region of the carrier 4. By virtue of that arrangement the hot air passes out of the carrier openings 4a as parallel as possible to the inside of the outside wall of the rotor 8.

To promote heating of the outside wall of the rotor 8 the rotor 8 can be made from aluminum as aluminum absorbs and conducts heat better than for example steel. As the outside wall of the rotor 8 only has to carry the force due to its own weight and has to withstand the wind forces acting thereon from the outside, such a construction is possible in the case of a Magnus rotor 2 without the required stability of the structure of the rotor 8 being adversely affected. In that case the hub 7 and the stationary parts, that is to say parts which do not rotate in operation of the Magnus rotor 2, can be made from steel to achieve a high level of structural stiffness as those parts do not need to absorb heat from the hot air and should also not do that in order for the heat of the hot air to be delivered as completely as possible to the outside wall of the rotor 8.

It is advantageous in that respect for the fan heater 3 to be fed with the electrical energy which is fed to the drive 15 in operation of the Magnus rotor 2 as the Magnus rotor 2 cannot be operated, that is to say driven by the drive 15, as long as the rotor 8 is iced up. That arrangement means that there is no need for further electrical installations in addition to the feed of the electrical energy to the drive 15, whereby it is possible to save on installation complication and expenditure when fitting the fan heater 3. The electrical installations are also only to be designed for the power consumption of one of the devices, that is to say either the drive 15 or the fan heater 3, and not for simultaneous power consumption on the part of both devices as those devices are not operated simultaneously.

Figure 8:
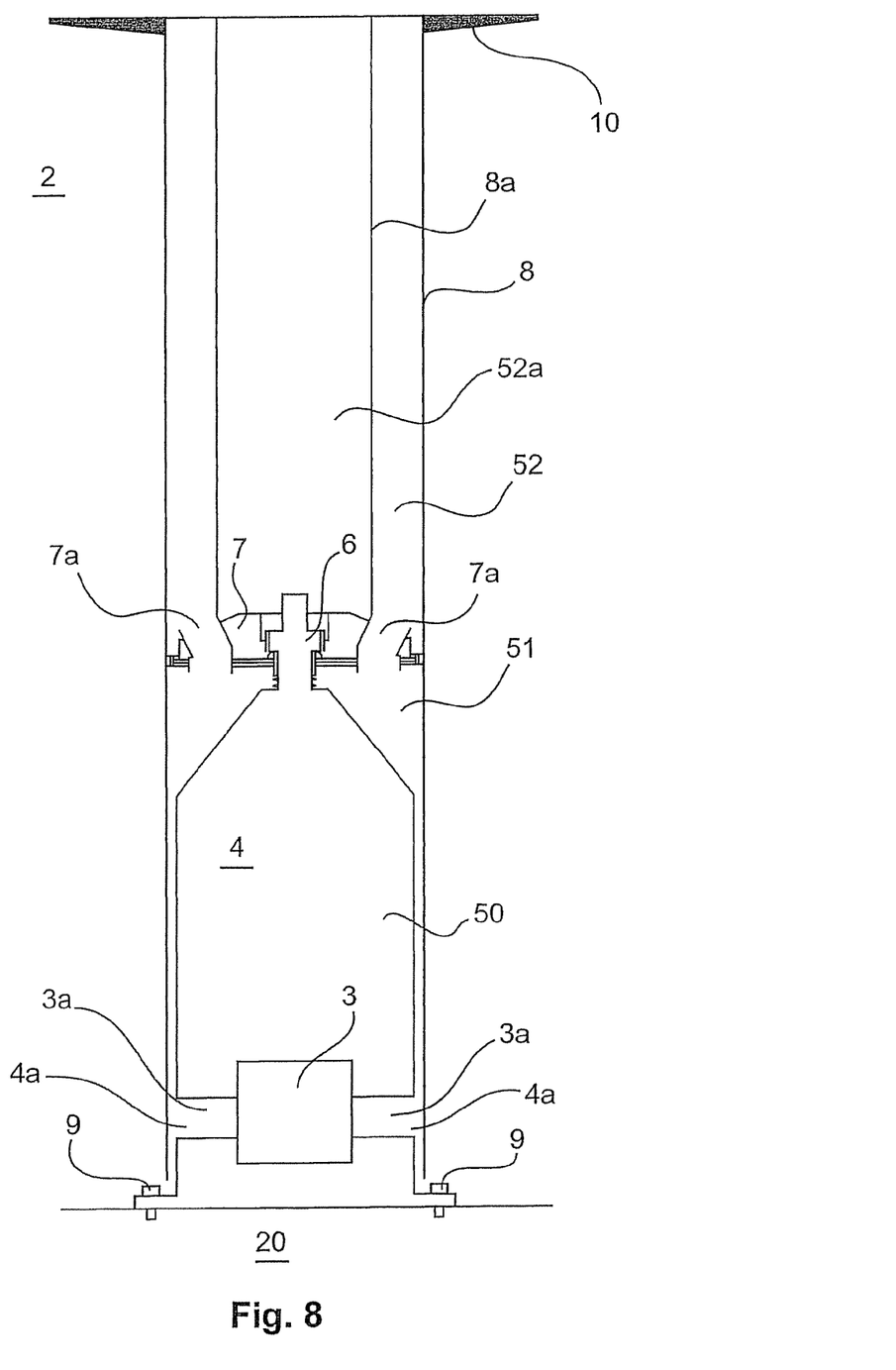
FIG. 8 shows a diagrammatic simplified side view of the Magnus rotor with a heating device in the second embodiment.

FIG. 8 shows a diagrammatic simplified side view of the Magnus rotor 2 with a heating device 3 in the second embodiment. In this view, a further preferably cylindrical body is provided as an internal cylinder 8a in the interior of the rotor 8. With its lower, preferably substantially circular edge, the internal cylinder 8a adjoins the hub 7 in such a way that the hub openings 7a are disposed between the rotor 8 and the internal cylinder 8a. In that way the intermediate space 52 between the hub 7 and the end plate 10 is subdivided into an intermediate space 52a within the internal cylinder 8a and an intermediate space 52 between the internal cylinder 8a and the rotor 8.

In this embodiment the hot air issuing from the hub openings 7a is guided along the inside surface of the rotor 8 where it gives off its heat thereto as quickly and completely as possible to heat up and thaw out the rotor 8. At the same time the hot air cannot circulate freely in the interior of the upper part of the rotor 8, that is to say in the intermediate space 52, as the interior of the internal cylinder 8a, that is to say the intermediate space 52a, is separated from the internal space 52 between the internal cylinder 8a and the rotor 8 by the internal cylinder 8a. That arrangement means that the heat of the hot air can be better utilized for heating and thawing the rotor 8 as no hot air is stored in the volume of the intermediate space 52a and is thus not used for heating and thawing the rotor 8.

To find out that ice has possibly formed at the outside wall of the rotor 8, weather data on the one hand can be referred to. In that case such weather data can be received by way of a data transmission. It is also possible to ascertain meteorological data in the area around the Magnus rotor 2, for example on the ship which can be driven by means of the Magnus rotor 2. Such data can include wind direction and strength, air temperature, relative humidity, air pressure and a change therein or the like, as well as the rotary speed of the rotor 8 and the temperature of the surface of the rotor 8. From those and other data it is then possible to conclude whether, climatically, icing at the outside wall of the rotor 8 is at all possible or probable.

It is also possible to provide for detection of a possible unbalance of the rotor 8. For that purpose, unbalances can be detected in at least two axially displaced planes perpendicularly to the axis of rotation of the rotor 8. Preferably the unbalances are detected by way of strain gauge measuring strips mounted for example in each plane. It is advantageous in that respect that strain gauge measuring strips which are already present and which are permanently fitted to the rotor 8 in order for example to measure the propulsion force can be used.

Figure 9:
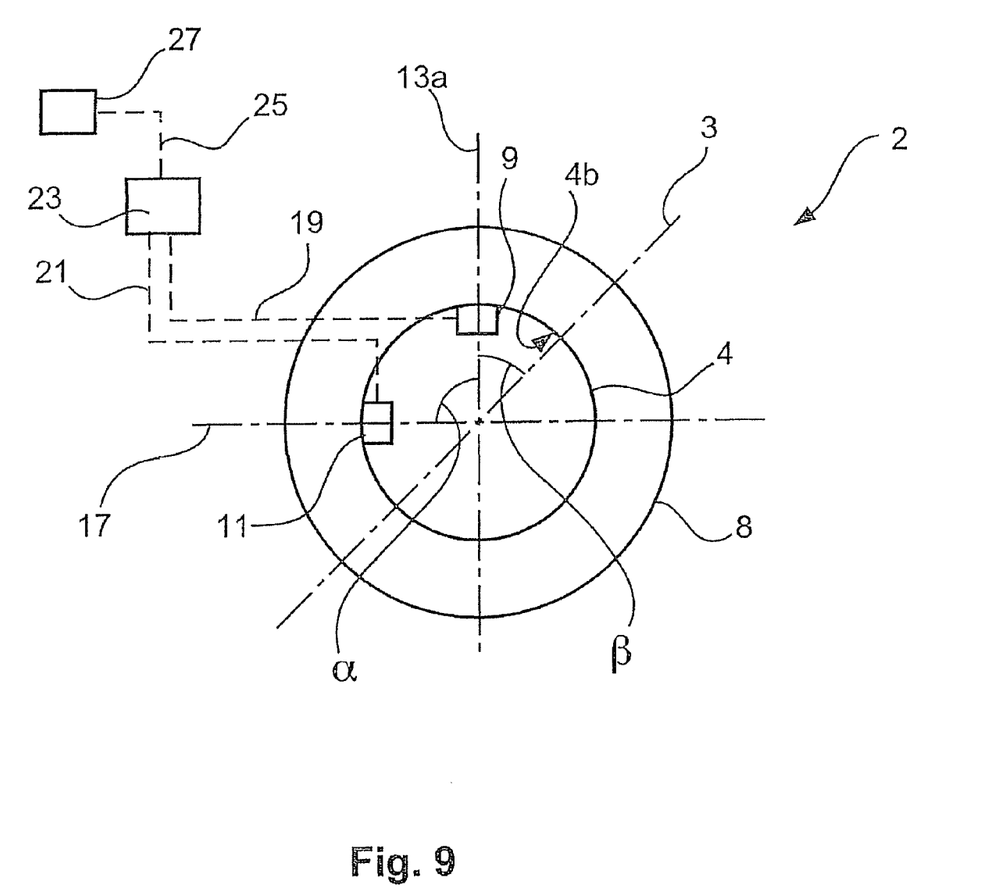
FIG. 9 shows a diagrammatic cross-sectional view through a Magnus rotor.

FIG. 9 shows a diagrammatic cross-sectional view through a Magnus rotor 2. The Magnus rotor 2 has the carrier 4 within the rotor 8. A first strain gauge sensor 9 and a second strain gauge sensor 11 are arranged as part of a measuring device, at the inside surface 4b of the carrier 4. The measuring device is adapted to determine a flexural loading on the rotor mounting arrangement as a consequence of a force acting substantially radially on the bearing 6, due to forces acting on the rotor 8. The measuring device has the two strain gauge sensors 9, 11 which in the present embodiment are arranged at an angle of 90° relative to each other. As viewed from the center point of the carrier 4, the first strain gauge sensor 9 is disposed on a first axis $13a$. The first axis $13a$ extends at an angle $\beta$ relative to the longitudinal axis of the ship. In a particularly preferred embodiment the angle $\beta=0°$. The second strain gauge sensor 11, viewed from the center point of the carrier, is arranged along a second axis 17 at the inside surface $4b$ of the carrier. In a particularly preferred embodiment the angle between the first axis $13a$ and the second axis 17 $\alpha=90°$.

The first strain gauge sensor 9 is connected to a data processing installation 23 by means of a signal line 19. The second strain gauge sensor 11 is connected to the data processing installation 23 by means of a second signal line 21. The data processing installation 23 is connected to a display device 27 by means of a third signal line 25. The display device 27 is adapted to display the direction and magnitude of the propulsion force acting on the carrier 4.

Additionally or alternatively to the described function of determining the propulsion force acting on the carrier 4, the strain gauge sensors 9, 11 of the measuring device and the device itself can also be used to detect unbalances at the rotor 8 in order, additionally or alternatively to determining ice adhering thereto by means of meteorological data, to detect same, to terminate operation of the Magnus rotor 2 in question and to thaw it out according to the invention.

The concept of the invention concerns a Magnus rotor which can be operated even upon the occurrence of sudden ice, for example in climatic regions like Canada. Such ice can very suddenly occur at temperatures below the freezing point, by rain or snow adhering to the Magnus rotor if it is cooled down below the freezing point. That sudden ice preferably occurs in that respect in the upper region of the Magnus rotor and can assume a great mass, of correspondingly great weight. That additional weight can mean that the Magnus rotor can no longer be operated.

For that purpose the Magnus rotor according to the invention has a thawing function. In that respect hot air is produced by means of a heating arrangement in the interior of the carrier of the Magnus rotor and passed from the inside through openings in the carrier to the outside wall of the rotor of the Magnus rotor, at which the sudden ice has been formed. That hot air causes the rotor to be heated and the ice to be melted. In that case the rotor comprising aluminum passes the heat of the hot air outwardly particularly well so that in that fashion thawing can be implemented particularly well. In addition the electrical energy for driving the Magnus rotor can be used for heating the air by the heating device as the iced-up Magnus rotor cannot be operated and thus both the devices, that is to say the heating device and the Magnus rotor drive, cannot be operated at the same time.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A ship comprising:
 a Magnus rotor secured to a surface of the ship, the Magnus rotor including:
  a rotor body;
  a carrier located inside the rotor body, the carrier having a surface with a plurality of openings that allows air to pass from an internal space of the carrier toward an intermediate space between the carrier and the rotor body;
  a connecting element coupled to the rotor body, the connecting element having at least one opening that allows air received from the internal space of the carrier to pass to the intermediate space;
  a bearing that rotatably couples the rotor to the carrier by the connecting element; and
  a heating device located in the internal space of the carrier for heating air, the heating device having a plurality of tubes, the heating device causing air heated by the heating device to flow through the plurality of tubes, through the plurality of openings in the carrier, and through the at least one opening of the connecting element to the intermediate space.

2. The ship according to claim 1 wherein the rotor body is aluminum.

3. The ship according to claim 1 wherein the plurality of openings of the surface of the carrier are located proximate an inner surface of the rotor body.

4. The ship according to claim 1 further comprising a cylindrical body centrally located inside the rotor body above the carrier, the cylindrical body causing the heated air to flow between an inner surface of the rotor body and an outer surface of the cylindrical body.

5. A method of heating a surface of a rotor body of a Magnus rotor, the rotor body having a carrier located in a first internal portion of the rotor body, the rotor body having a second internal portion located above the carrier, the method comprising:
 heating air within an internal portion of a carrier; and
 causing the heated air to flow through a plurality of tubes, through a plurality of openings in the carrier, and through at least one opening in a connecting element, the connecting element coupled to the rotor body and rotatably coupled to the carrier by a bearing, wherein the heated air enters the second internal portion of the rotor body that is located above the carrier.

6. The method of claim 5 wherein heating air within the internal portion of the carrier comprises heating air by causing air to flow past an electric component having current flowing therethrough.

7. The ship according to claim 1 wherein the at least one opening of the connecting element is a plurality of openings, and wherein the plurality of openings occupy more area in a horizontal plane than the connecting element itself.

8. The ship according to claim 7 wherein the plurality of tubes of the heating device, the plurality of openings of the carrier, and the plurality of openings of the connecting element are in vertical alignment with each other.

9. The ship according to claim 8 wherein the plurality of tubes of the heating device, plurality of openings of the carrier, and the plurality of openings of the connecting element have an area that is larger in a first direction than in a second, perpendicular direction.

10. The ship according to claim 8 wherein the plurality of tubes of the heating device, plurality of openings of the carrier, and the plurality of openings of the connecting element are located proximate the inner surface of the rotor body.

11. The ship according to claim 1 wherein the carrier is made from steel.

12. The ship according to claim 1 further comprising an electric motor located in the internal space of the carrier, wherein the heating device is supplied with electrical energy from the electric motor.

* * * * *